United States Patent
Lettow et al.

(10) Patent No.: US 9,042,011 B2
(45) Date of Patent: May 26, 2015

(54) MICROSCOPE HAVING A TRANSMITTED-LIGHT ILLUMINATING DEVICE FOR CRITICAL ILLUMINATION

(75) Inventors: Robert Lettow, Winterthur (CH); Guenter Grabher, Lustenau (AT)

(73) Assignee: LEICA MICROSYSTEMS (SCHWEIZ) AG, Heerbrugg (CH)

( * ) Notice: Subject to any disclaimer, the term of this patent is extended or adjusted under 35 U.S.C. 154(b) by 264 days.

(21) Appl. No.: 13/613,283

(22) Filed: Sep. 13, 2012

(65) Prior Publication Data

US 2013/0070335 A1    Mar. 21, 2013

(30) Foreign Application Priority Data

Sep. 15, 2011    (DE) .......................... 10 2011 082 770

(51) Int. Cl.
*G02B 21/06*    (2006.01)
*G02B 3/00*    (2006.01)
*G02B 21/08*    (2006.01)
*G02B 5/02*    (2006.01)

(52) U.S. Cl.
CPC .............. *G02B 3/0056* (2013.01); *G02B 5/021* (2013.01); *G02B 5/0278* (2013.01); *G02B 21/086* (2013.01)

(58) Field of Classification Search
USPC ........................... 359/385–390; 362/317–361
See application file for complete search history.

(56) References Cited

U.S. PATENT DOCUMENTS

| | | | | |
|---|---|---|---|---|
| 7,229,202 | B2* | 6/2007 | Sander | 362/575 |
| 7,382,529 | B2* | 6/2008 | Sander | 359/385 |
| 7,547,874 | B2* | 6/2009 | Liang | 250/216 |
| 8,000,018 | B2* | 8/2011 | Benitez et al. | 359/626 |
| 8,076,869 | B2* | 12/2011 | Shatford et al. | 315/294 |
| 8,203,784 | B2* | 6/2012 | Nolte et al. | 359/385 |
| 2012/0050852 | A1* | 3/2012 | Angelini et al. | 359/385 |
| 2012/0057155 | A1* | 3/2012 | Gastaldo | 356/237.5 |
| 2012/0127468 | A1* | 5/2012 | Bloch et al. | 356/391 |
| 2014/0070106 | A1* | 3/2014 | Westphal et al. | 250/368 |

FOREIGN PATENT DOCUMENTS

DE    202005020814 U1    9/2006

OTHER PUBLICATIONS

Khatod Optoelectronic, Technical Report, Lenses Test Report, May 26, 2011, p. 1-9, Code 110000000097.

* cited by examiner

*Primary Examiner* — Frank Font
(74) *Attorney, Agent, or Firm* — Leydig, Voit & Mayer, Ltd.

(57) ABSTRACT

A microscope includes a light source including an LED device having a light radiating surface and a light directing element including a larger coupling-out surface. The light directing element is disposed so as to couple in light radiated by the light source and couple out the radiated light from the coupling-out surface. The light directing element is disposed so that the light is radiated out in an angular range of ±10° to ±50° and illuminates an area at 5 meters in an angular range of at least ±5° with intensity fluctuations of less than 50%. A condenser is disposed between the coupling-out surface of the light directing element and the object to be viewed. The condenser has an aperture with an aperture dimension and is disposed such that the aperture is irradiated completely with the light coupled out from the coupling-out surface.

19 Claims, 3 Drawing Sheets

MICROSCOPE HAVING A TRANSMITTED-LIGHT ILLUMINATING DEVICE FOR CRITICAL ILLUMINATION

CROSS REFERENCE TO RELATED APPLICATIONS

This application claims priority to German Patent Application No. DE 10 2011 082 770.6, filed Sep. 15, 2011, which is hereby incorporated by reference herein in its entirety.

FIELD

The present invention relates to a microscope having a transmitted-light illuminating device (transillumination device) for critical illumination.

BACKGROUND

Conventional light sources of the kind used in optical microscopy are highly inhomogeneous in themselves (for example coiled filaments or LED arrays), with the result that diffusers, usually diffusion disks, are regularly used. However, this leads to a loss of light in the direction of the object, so that the light source has to be correspondingly brighter.

In simple microscopes so-called critical illumination is often used which requires few optical components. Usually, at least the collector and field shutter can be dispensed with. The object is located essentially at the focal point of the condenser at the specimen end, which is irradiated with substantially parallel light over a large area. Any aperture shutter present is located substantially in the focal point of the condenser at the lamp end. Inhomogeneities in the far field of the light source are directly visible in the object image. If the area of the light source is too small, vignetting occurs in the object image.

However, the provision of light sources that have a sufficiently large area while at the same time being homogeneous is very costly. Particularly with higher quality microscopes with greater demands on the optical quality, such light sources can only be provided at very great expense and effort.

To be able to supply sufficient light intensity for high magnifications, strong lighting means have to be used. LEDs are popular as compact lighting means which have a number of advantages. However, it is normally necessary to use a plurality of LEDs to achieve sufficiently high intensity lighting.

In order to be able to provide sufficient homogeneity, particularly for different magnifications, diffusers, usually diffuser disks, have to be used as the interstices between the LEDs in particular lead to significant inhomogeneity. However, the use of a diffuser disk leads to a loss of light, making it necessary to use brighter LEDs and/or more of them.

In order to be able to provide sufficient illumination without vignetting, the light sources have to be enlarged. This requires on the one hand a lens system and on the other hand a relatively long optical path, which makes it necessary to fold the optical path. Both of these increase the cost enormously.

The provision of good quality critical illumination is therefore very expensive, which is why in high quality microscopes essentially only so-called Koehler illumination is used, which makes few demands of the light source. However, additional optical elements are required for this.

It is desirable to have sufficiently homogeneous critical illumination for high quality optical microscopes at low cost.

SUMMARY

In an embodiment, the present invention provides a microscope with a transmitted-light illuminating device for critical illumination of an object to be viewed. The microscope includes a light source including an LED device having a smaller light radiating surface and a light directing element including a larger coupling-out surface with a coupling out surface dimension. The light directing element is disposed so as to couple in light radiated by the light source and couple out the radiated light from the coupling-out surface. The light directing element is disposed so that the light is radiated out in an angular range of at least ±10° and at most ±50° and so as to illuminate an area at a distance of 5 m in an angular range of at least ±5° with intensity fluctuations of less than 50%. A condenser is disposed between the coupling-out surface of the light directing element and the object to be viewed. The condenser has an aperture with an aperture dimension and is disposed such that the aperture is irradiated completely with the light coupled out from the coupling-out surface.

BRIEF DESCRIPTION OF THE DRAWINGS

Exemplary embodiments of the present invention are described in more detail below with respect to schematically represented presentations in the drawings, in which.

DETAILED DESCRIPTION

Figure 1:
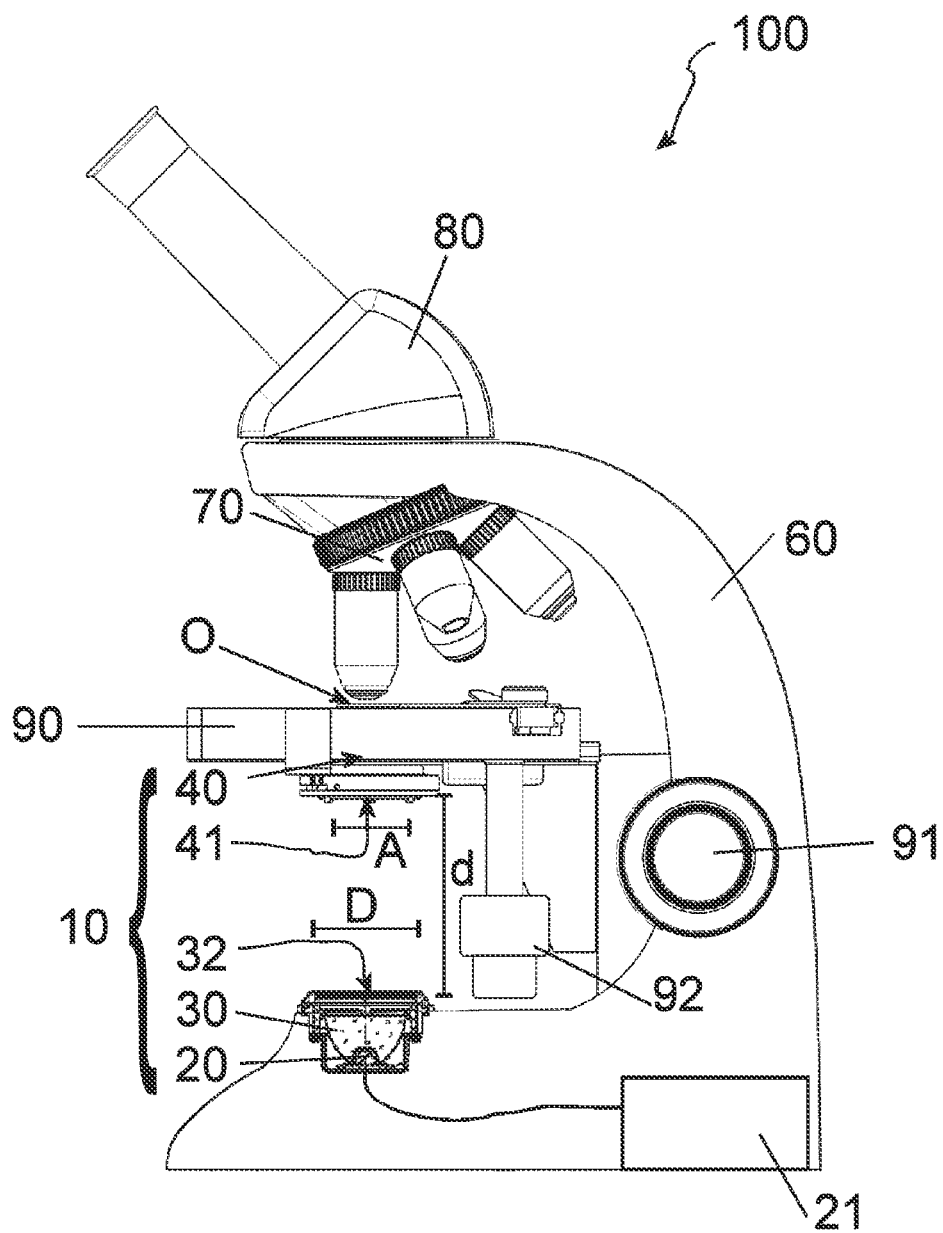
FIG. 1 shows an embodiment of a microscope according to the invention in schematic side view, with the stand base shown in longitudinal section.

In an embodiment, the present invention provides a microscope with a transmitted-light illuminating device for critical illumination.

The light source has an LED device which comprises at least one LED. The use of light-emitting diodes reduces the power consumption and the heat given off, compared with coiled filaments, so that hardly any additional space is required for expensive cooling. An LED has advantages over conventional incandescent bulbs as it has only a small volume while having a high lighting power and low power consumption and because it can be dimmed without changing the color temperature. Thanks to the use of a suitable light directing element (as explained hereinafter) it is not necessary to use conventional diffusers, with the result that a sufficient light intensity can be achieved even if the LED device has only a few LEDs, preferably between one and at most four LEDs, thus simplifying the construction and reducing inhomogeneities which originate particularly from gaps between LEDs.

For controlled adjustment of the directional characteristics of the light source, a light directing element is used. This generates a predetermined illumination (size, drop in brightness, etc.) of a distant surface. This is done by different changes in the direction of coupled-in light on walls of the light directing element and/or by means of suitable structures (e.g. lenses) on the coupling-out surface. In contrast to conventional microscope illumination, the light directing element does not cause any imaging of the light source. The coupling-out surface is large enough for illumination of the total surface area of the condenser aperture. It has been found that the objective pupils of objectives with different degrees of magnification are illuminated well if the coupling-out surface is greater than the maximum condenser aperture. As explained above, the light source itself has a relatively small light radiation area which is, in particular, smaller than the coupling-out surface.

The light proceeding from the light directing element is focussed sufficiently for a high light efficiency and homogeneously enough for critical illumination. For this purpose the system comprising the light source and light directing element is arranged so that the light proceeding from the light directing element is radiated in an angular range of at least ±10° and at most ±50° and illuminates an area at a distance of 5 m in an angular range of at least ±5° (in the optical paths with a round cross-section conventionally used in microscopy this corresponds to an illuminated round area at least 87.5 cm in diameter) with fluctuations in intensity of less than 50%, preferably less than 35%, more preferably less than 25%. In other words, the brightness fluctuates within a range of at least ±5° around the optical axis by a maximum of only 50%, 35% or 25%.

A diffuser disk of the kind conventionally used for homogenisation in microscopy illumination is not needed. The loss of light associated with the diffuser disk therefore does not occur and sufficient brightness is provided even by a relatively few LEDs.

Suitable light directing elements are known for example from room lighting technology. They are essentially frustum-shaped with a smaller coupling-in surface and a larger coupling-out surface. The coupling-out surface often has a lens arrangement, preferably a microlens arrangement with more than 20 microlenses, preferably in a honeycomb-like structure. They are usually made of transparent plastics. Within the context of the invention it has been found that light directing elements of this kind may also be used to advantage in the field of critical microscope lighting. In fact, lighting devices from other specialist fields are not usually suitable for microscopy, as in the microscope there is a so-called interlaced optical path with imaging of the lamp and the pupils of the illumination through the condenser, the object plane, and the objective right up to the exit pupil of the eyepiece. For this reason data on the homogeneity of lamps that relate to the illumination of a surface cannot be applied to the homogeneity of a microscope illumination.

In an embodiment, the invention provides, at little cost, sufficiently homogeneous critical illumination for high quality optical microscopes, particularly with interchangeable objectives, i.e. for very different magnifications and hence very different homogeneity and brightness requirements as well.

However, depending on the light directing element used there may possibly also be inhomogeneities in the near field, i.e. in the area just after the coupling-out surface. It has been found that a distance between the coupling-out surface and the condenser aperture that corresponds to at least twice the diameter of the coupling-out surface achieves a sufficient homogeneity of the object under observation for objectives with magnifications of 20× upwards.

The greater the distance of the coupling-out surface from the condenser aperture, the more homogeneously the object field is illuminated. However, the distance is preferably chosen to be at most of such a magnitude that there is no need for any folding of the illuminating optical path. This leads to cost advantages as no deflecting means are required. Usually, a distance that corresponds to four times the diameter of the coupling-out surface will still allow a straight optical path between the coupling-out surface and the condenser.

At low magnifications and the attendant small aperture, the depth of focus of the image may be so great that even a relatively distant coupling-out surface may be visible in the object image. The image becomes inhomogeneous. However, as the light density required at low magnifications is also low, a diffuser (preferably a diffuser disk) may be provided in the optical path in these cases. To make it possible to detect the condenser aperture (for example an aperture shutter) in the eyepiece, the diffuser is expediently arranged between the coupling-out surface and the condenser aperture. It can preferably be pivoted in and out. It is preferably arranged close to the condenser aperture in order to minimise the loss of light as far as possible.

The same also applies if an aperture shutter (iris) is largely closed when using objectives of high magnification. It is therefore advantageous if a diffuser is provided as a function of the aperture, i.e. the diffuser is introduced when an aperture dimension (usually a shutter diameter) falls short of a predetermined magnitude.

If the light source used is bright enough, the diffuser may also be provided permanently.

In order to permit homogeneous illumination for small aperture dimensions with an attendant high depth of focus, on the one hand, and to provide a sufficient light density for objectives with a high magnification, on the other hand, the diffuser is configured, in a particularly advantageous manner, so that only light in a predetermined range is scattered around the optical axis. For this purpose the diffuser is embodied as a clear disk with a predefined diffusing (preferably matt) central region. This diffuser is particularly suitable for permanent mounting in the optical path.

In an embodiment, the predefined region is round and has a diameter corresponding to a lighting aperture of 0.35. (A numerical aperture of 0.35 corresponds to the usual aperture of a 20× objective.) A diameter that is up to 1.5 times greater is also suitable, as in this case the diffusing surface is still small compared with the total coupling-out surface and thus there is still a high lighting intensity at high magnifications.

There are known applications (e.g. contrasting methods) in which the lighting aperture is closed even at higher magnifications. When the lighting aperture diameter gets close to the predefined range, there may be disruptive scattering effects at the edge between the diffusing region and the clear region. Moreover, the gradient of the quadratic dependency of the light intensity in the object field on the iris diameter varies, as indicated by an increased drop in brightness. The solution to this would appear to be a predefined region of non-round configuration, for example in the shape of a star or other tapering structures. As a result of the non-round (e.g. star-shaped) configuration, scattering effects at the edges are minimised and there are no unusual brightness effects when the aperture is closed. The matt (essentially round) center of the non-round region should in turn correspond to the predefined diameter of a lighting aperture of 0.35. Alternatively or additionally, matt areas with gradients may be used.

Further advantages and embodiments of the invention will become apparent from the description and the attached drawings.

It will be understood that the features mentioned hereinbefore and the features that are yet to be described hereinafter may be used not only in the particular combination stated but also in other combinations or on their own, without departing from the scope of the present invention.

FIG. 1 shows a preferred embodiment of a microscope 100 according to an embodiment of the invention in schematic side view, with the stand base shown in longitudinal section. The microscope 100 is used for viewing an object O which is arranged on a microscope stage 90. The microscope has a stand 60 for supporting different microscope elements, particularly a transmitted-light illuminating device 10, a revolving objective array 70 with different objectives 71 and a tube 80 with an eyepiece.

The microscope stage is movable in the z or x/y direction by means of rotary knobs 91 and 92.

The transmitted-light illuminating device 10 comprises a light source 20 which is embodied as an LED device. An energy supply 21 serves to supply the LED device. Above the LED device 20 is provided a light directing element 30 which comprises, on its side facing the object O that is to be illuminated, a larger coupling-out surface 32 with a dimension (in this case a diameter) D. The light radiating surface (chip surface) of the light source 20 is significantly smaller than the coupling-out surface 32 of the light directing element, preferably less than a half, a third or a quarter of the size.

The illuminating device further comprises a condenser 40 which has a condenser aperture 41 with a dimension (in this case diameter) A which is embodied as an adjustable iris shutter in the present example. The transmitted-light illuminating device 10 is set up for critical illumination of the object O under examination. The object O is therefore located substantially in the focal point, on the specimen side, of a condenser 40, the aperture shutter 41 is located substantially in the focal point, on the lamp side, of the condenser 40.

The distance d of the coupling-out surface 32 from the aperture 41 is twice the dimension D of the coupling-out surface in the embodiment shown.

The light directing element 30 directs the light radiated by the LED device 20 such that it shines out of the coupling-out surface 32 in an angular range of between 10 degrees and 50 degrees. In the far field the light has an intensity distribution so that in a range of at least 5° around the main direction of radiation the intensity fluctuates by at most 50% (cf. FIG. 3).

Figure 2:
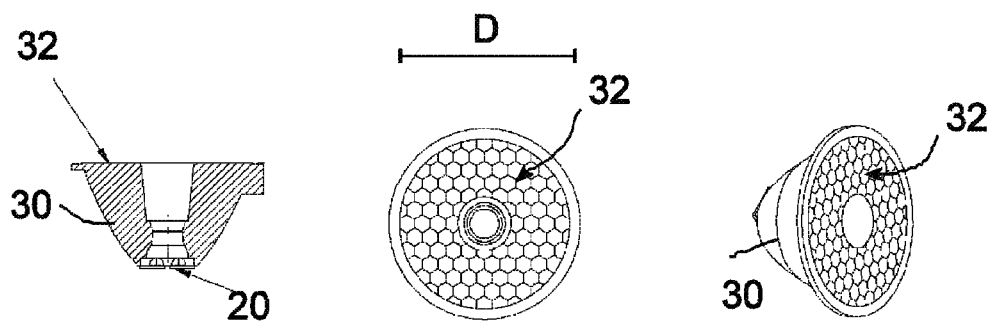
FIG. 2 shows an embodiment of a light directing element, in a cross-sectional view (left), plan view (center) and perspective view (right)

FIG. 2 schematically shows the system comprising the light source 20 and light directing element 30 in cross-sectional view (left), in plan view (center) and in perspective view (right).

In the present embodiment the LED device 20 comprises four individual LEDs in a rectangular array. However, it may also comprise fewer LEDs, preferably only one LED. The light radiated out from the LED device 20 as the light source is coupled into the light directing element 30 at suitably shaped coupling-in surfaces and is coupled out again at the upper coupling-out surface 32. The coupling-out surface 32 has a microlens array, the microlenses being honeycomb-shaped. The light directing element 30 does not, however, image the light source 20. A preferred radiation characteristic of a light directing element with LED is shown in FIG. 3.

Figure 3:
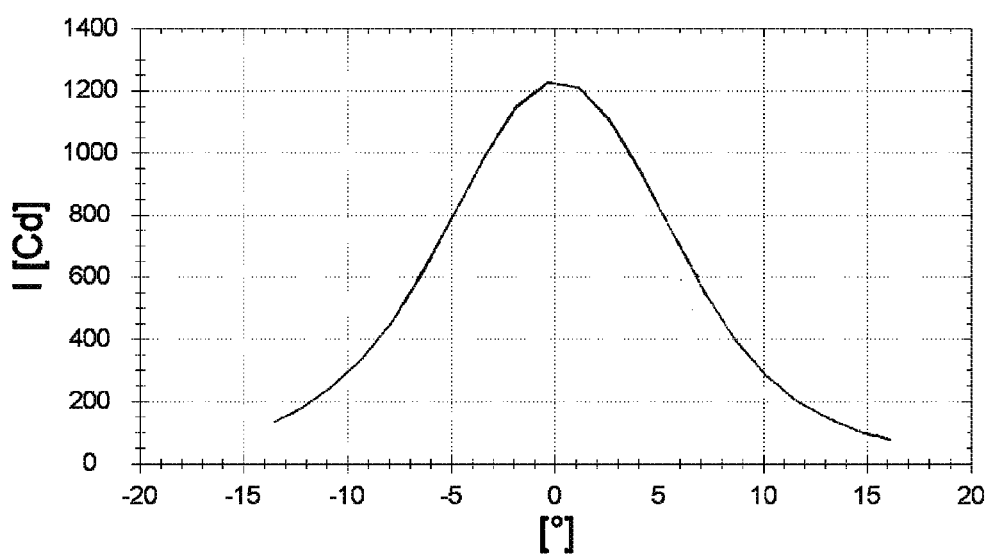
FIG. 3 shows a diagram of the radiation characteristics of a suitable light source with light directing element.

FIG. 3 shows the light intensity in a Cartesian diagram. The light intensity I [Cd] at a distance of 5 meters is plotted on the y axis against the radiation angle [°] on the x axis, the light source 20 used being a single Luxeon Rebel Whitelight LED. It is apparent that the light is directed such that the center of gravity of the radiation is located in the region of the optical axis(0°). Thus a certain collimation of the radiated light takes place so that the essential lighting power is in the range between −15° and +15°. It is also apparent that between −5° and +5° there is only a small fluctuation in intensity which is less than 50%.

In a microscope according to FIG. 1, with an aperture 41 of small dimensions (aperture shutter opening diameter A), the depth of focus may be so great that the structure of the coupling-out surface becomes visible in the object image. This leads to undesirable inhomogeneity. To eliminate this inhomogeneity a diffuser may be provided in the optical path between the coupling-out surface 32 and the aperture 41, preferably close to the aperture 41. In a preferred embodiment of the invention the diffuser is specially configured, as will be explained hereinafter with reference to FIGS. 4 and 5. The diffusers may be permanently arranged in the optical path or may be pivoted in and out depending on the aperture dimensions. In this case, if the threshold aperture dimension (normally the diameter) falls below a certain level, they are pivoted in and if it exceeds this level they are pivoted out. The threshold aperture dimension preferably corresponds to a numerical aperture of 0.35.

Figure 4:
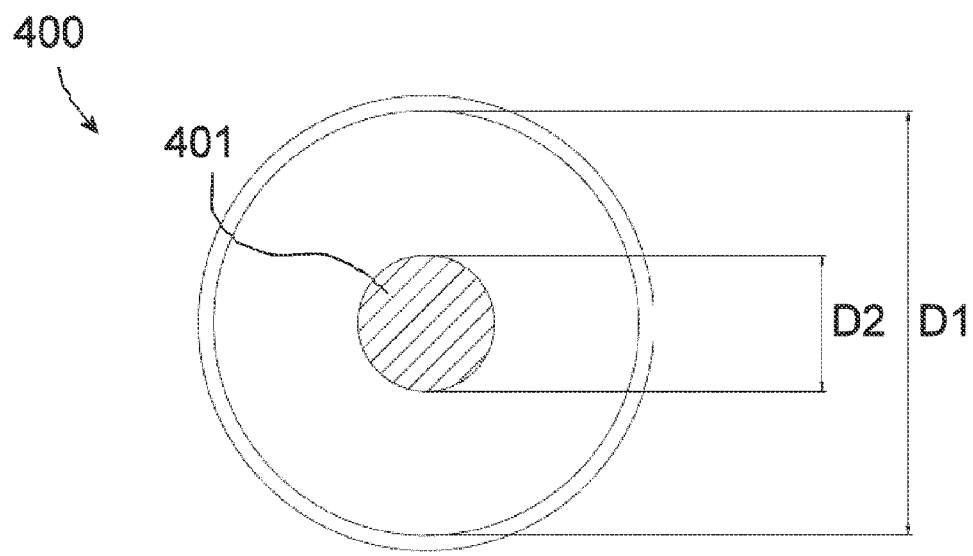
FIG. 4 schematically shows an embodiment of a diffuser that is suitable for the invention.
Figure 5:
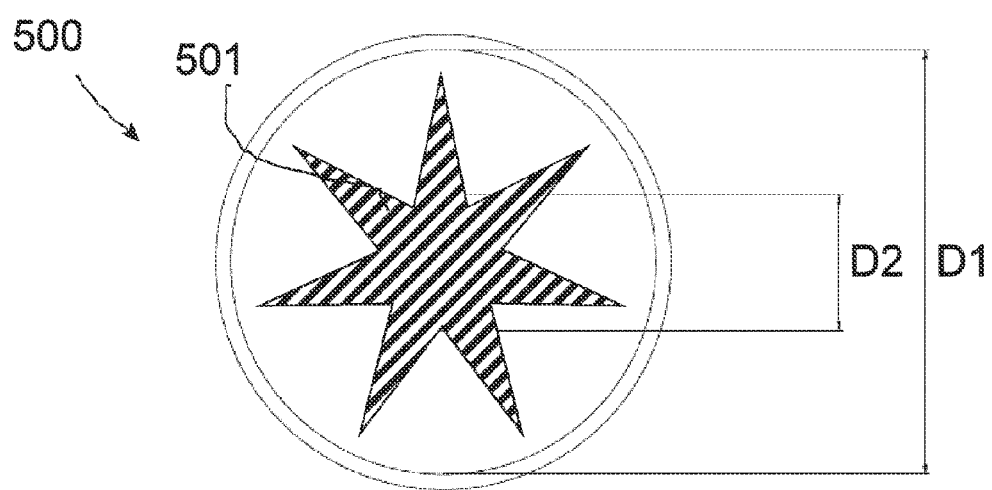
FIG. 5 schematically shows another embodiment of a diffuser that is suitable for the invention.

FIG. 4 shows an embodiment 400 and FIG. 5 shows an embodiment 500 of a diffuser of this kind. Both diffusers essentially consist of a clear disk of diameter D1 which is configured to have a diffusing effect in a predetermined region 401 or 501, respectively. For this purpose the predetermined region is preferably made matt, e.g. by sandblasting. The diameter D1 is selected such that the diffuser can easily be arranged in the optical path without causing shadowing. It conveniently corresponds to at least one maximum possible dimension of the lighting aperture.

The embodiment according to FIG. 4 comprises a round diffusing region 401, the dimension D2 of which (in this case the diameter) is matched to a predetermined aperture dimension (preferably corresponding to a numerical aperture of 0.35).

The embodiment 500 according to FIG. 5 is of star-shaped configuration, while a dimension D2 of a central (more particularly convex) region in the center is also matched to a predetermined aperture dimension (preferably corresponding to a numerical aperture of 0.35). Besides the central region in the middle, the predetermined region 501 additionally has tapering structures in order to avoid, in particular, an abrupt reduction in light during the closing of the aperture shutter, and diffusion at the transition from the diffusing region to the clear region.

While the invention has been particularly shown and described with reference to preferred embodiments thereof, it will be understood by those skilled in the art that various changes in form and details may be made therein without departing from the spirit and scope of the invention.

What is claimed is:

1. A microscope comprising:
    an objective disposed so as to face a first side of an object to be viewed; and
    a transmitted-light illuminating device configured to provide critical illumination of the object to be viewed, the transmitted light illuminating device comprising:
        a light source including an LED device having a light radiating surface;
        a light directing element including a coupling-out surface that is larger than the light radiating surface of the light source and has a coupling-out surface dimension, the light directing element being disposed so as to couple in light radiated by the light source and couple out the radiated light from the coupling-out surface, the light directing element being configured to couple out light from the coupling-out surface so as to radiate out in an angular range of at least ±10° and at most ±50° and so as to illuminate an area at a distance of 5 m in an angular range of at least ±5° with intensity fluctuations of less than 50%; and
        a condenser disposed between the coupling-out surface of the light directing element and a second, opposite side of the object to be viewed, the condenser having an aperture with an aperture dimension, the condenser being disposed such that the aperture is irradiated completely with the light coupled out from the coupling-out surface.

2. The microscope recited in claim 1, wherein the coupling-out surface dimension is greater than the aperture dimension.

3. The microscope recited in claim 1, wherein the coupling-out surface includes a lens arrangement.

4. The microscope recited in claim 1, wherein a spacing of the coupling-out surface from the aperture is at least twice and at most four times the coupling-out surface dimension.

5. The microscope recited in claim 1, wherein the aperture is disposed in a focal point of the condenser on a light source side.

6. The microscope recited in claim 1, wherein an optical path between the coupling-out surface and the condenser is not folded.

7. The microscope recited in claim 1, wherein the aperture dimension is adjustable by using an iris shutter.

8. The microscope recited in claim 1, further comprising a diffuser disposed in an optical path between the coupling-out surface and the condenser aperture.

9. The microscope recited in claim 8, wherein the diffuser is immediately adjacent to the condenser aperture.

10. The microscope recited in claim 8, wherein the diffuser includes a clear disk having a predetermined diffusing region.

11. The microscope recited in claim 10, wherein the diffusing region is round and has a dimension which corresponds to a predetermined lighting aperture.

12. The microscope recited in claim 10, wherein the diffusing region is non-round.

13. The microscope recited in claim 12, wherein the diffusing region is star-shaped.

14. The microscope recited in claim 13, wherein a central region within the diffusing region has a dimension which corresponds to a predetermined lighting aperture.

15. The microscope recited in claim 14, wherein the central region is convex.

16. The microscope recited in claim 8, wherein the diffuser is pivotably mounted, so as to be capable of being pivoted into the optical path and pivoted out of the optical path.

17. The microscope recited in claim 16, further comprising a mechanism configured to pivot the diffuser into and out of the optical path based on the aperture dimension.

18. The microscope recited in claim 1, wherein the light radiating surface is less than half of a size of the coupling-out surface.

19. The microscope recited in claim 18, wherein the light radiating surface is less than a quarter of the size of the coupling-out surface.

\* \* \* \* \*